(12) United States Patent
Griffin et al.

(10) Patent No.: US 12,476,972 B2
(45) Date of Patent: Nov. 18, 2025

(54) MANAGING ACCESS REQUESTS FOR POLICY-BASED ACCESS CONTROL SYSTEMS IN COMPUTER NETWORKS

(71) Applicant: RED HAT, INC., Raleigh, NC (US)

(72) Inventors: Leigh Griffin, Waterford (IE); Pierre-Yves Chibon, Paris (FR)

(73) Assignee: Red Hat, Inc., Raleigh, NC (US)

( * ) Notice: Subject to any disclaimer, the term of this patent is extended or adjusted under 35 U.S.C. 154(b) by 442 days.

(21) Appl. No.: 17/731,592

(22) Filed: Apr. 28, 2022

(65) Prior Publication Data

US 2023/0353572 A1  Nov. 2, 2023

(51) Int. Cl.
*H04L 9/40* (2022.01)
*H04L 9/06* (2006.01)

(52) U.S. Cl.
CPC .......... *H04L 63/101* (2013.01); *H04L 9/0643* (2013.01); *H04L 63/102* (2013.01); *H04L 63/20* (2013.01)

(58) Field of Classification Search
CPC ... H04L 63/101; H04L 9/0463; H04L 63/102; H04L 63/20
See application file for complete search history.

(56) References Cited

U.S. PATENT DOCUMENTS

| 8,700,771 | B1 | 4/2014 | Ramankutty et al. |
| 10,958,662 | B1 | 3/2021 | Sole et al. |
| 2008/0120302 | A1 | 5/2008 | Thompson et al. |
| 2018/0048648 | A1* | 2/2018 | Angelino ............ G06F 21/6218 |
| 2020/0221338 | A1* | 7/2020 | Luna ................. H04W 52/0258 |

FOREIGN PATENT DOCUMENTS

| CN | 108696579 A | * 10/2018 | ......... H04L 67/2842 |
| CN | 106534199 A | 11/2019 | |
| WO | WO-2005116979 A2 | * 12/2005 | ........... G06Q 10/107 |

OTHER PUBLICATIONS

Wei, et al., "Authorization Recycling in Hierarchical RBAC Systems," Univ. of British Columbia and Royal Holloway, Univ. of London, Jun. 2009, pp. 1-32.

(Continued)

*Primary Examiner* — Alexander Lagor
*Assistant Examiner* — Shu Chun Gao
(74) *Attorney, Agent, or Firm* — Kilpatrick Townsend & Stockton LLP (57) ABSTRACT

Access requests for policy-based access control systems can be managed according to some examples. In one example, a system can receive, from a client device, a first access request for accessing a particular resource. The system can determine a first response approving or denying the first access request based on an access control policy. The system can store a data entry indicating the first response to the first access request. The system can set a flag to indicate that a future access request for the particular resource is to be handled using the data entry. Subsequent to setting the flag, the system can receive a second access request from the client device for accessing the particular resource. Based on determining that the flag is set, the system can determine a second response to the second access request based on the data entry rather than the access control policy.

21 Claims, 5 Drawing Sheets

(56) References Cited

OTHER PUBLICATIONS

Fadhel, Ameni Ben, "Comprehensive Specification and Efficient Enforcement of Role-Based Access Control Policies Using a Model-Driven Approach," Dissertation, The Faculty of Sciences, Technology and Communication, Univ. of Luxembourg, Jan. 1989, pp. 1-155.
Spyra, Grzegorz Karol, "Embedded Document Security Using Sticky Policies and Identity Based Encryption," Thesis, Edinburgh Napier Univ., Jan. 2019, pp. 1-226.
Walker, et al., "On Automated Role-Based Access Control Assessment in Enterprise Systems," Computer Science, Baylor Univ., 2020, pp. 375-385.

* cited by examiner

MANAGING ACCESS REQUESTS FOR POLICY-BASED ACCESS CONTROL SYSTEMS IN COMPUTER NETWORKS

TECHNICAL FIELD

The present disclosure relates generally to policy-based access control systems for computer networks. More specifically, but not by way of limitation, this disclosure relates to managing responses to access requests for policy-based access control systems in computer networks.

BACKGROUND

Policy-based access control systems are systems used to regulate access to computer or network resources. Policy-based access control systems may utilize access control policies to allow or deny a user access to the computer or network resources. The access control policies may be used to regulate access based on roles of the user requesting access or the resources. In some instances, users may submit access requests for accessing a resource to the policy-based access control system. The policy-based access control system may determine applicable access control policies for the access request and may apply the access control policies to the access requests to determine if the user may access the resource.

DETAILED DESCRIPTION

Policy-based access control systems are becoming increasingly popular for use in protecting resources from unauthorized access. In some cases, policy-based access control systems may be deployed in time sensitive environments where it is beneficial to generate and output responses to access requests in near real time (e.g., within milliseconds of receiving the access request). It may be difficult to maintain near real time response times if the policy-based access control system is receiving an unexpected increase in access requests. This is because there is inherently latency in evaluating each access request using a policy-based access control system, and that latency may compound with a large number of access requests. Additionally, the access requests may follow the 80:20 pattern, where 80% of the access requests originate from 20% of the population. This can often be the case for popular resources. As a result, the policy-based access control system may evaluate identical access requests for identical resources based on the same access control policies each time, which can waste valuable computing resources (e.g., processing power, memory, and storage space).

Some examples of the present disclosure can overcome one or more of the abovementioned problems by storing responses to access requests generated by a policy-based access control system and selectively reusing those stored responses to respond to future access requests (e.g., rather than executing the policy-based access control system again). In particular, as the policy-based access control system is receiving access requests and determining responses based on access control policies, some or all of those responses may be stored in a datastore. The system can then use flags to selectively switch between using the stored responses or the policy-based access control system to respond to subsequent access requests based on one or more factors. For example, a flag may be set for accessing the stored response if the volume of access requests or the CPU load is too high. Accessing a stored response may be faster and less computationally demanding than determining an appropriate access control policy and applying the access control policy to determine the response. In this way, the system can dynamically monitor the conditions in the system and set flags to switch between the two approaches to reduce CPU load and latency.

In one particular example, a client device may transmit an access request to a policy-based access control system. The access request may be a request for connecting the client device to a Wi-Fi network. The policy-based access control system may determine one or more access control policies that apply to the user (e.g., the client device), the resource (e.g., the Wi-Fi network), and the action (e.g., connecting the client device to the Wi-Fi network). The policy-based access control system may determine a response to the access request based on the one or more access control policies. The response may approve or deny the access request. In some examples, the response may include a request for further verification from the client device. The policy-based access control system may additionally store a data entry indicating the response, such as in a datastore, to be accessed for future access requests.

The policy-based access control system may continue to apply access control policies to access requests to determine responses until a flag is set to indicate that a future access request for the particular resource is to be handled using the data entry. For example, due to a high volume of incoming access requests, the average response time for the policy-based access control system may exceed a predetermined threshold, such as 20 milliseconds. In response to exceeding the predetermined threshold, a flag may be set. Based on the flag being set, an access request for connecting the client device to the Wi-Fi network may be determined by accessing the previously stored response for the access request. Responses for such access requests may be determined using the data entry until the flag is disabled. For example, the flag may be disabled when policy-based access control system is capable of determining responses faster than the predetermined threshold time, such as when the volume of access requests decreases. In some examples, an access log may be updated each time a response to an access request is determined by accessing the data entry. The response may be transmitted to the client device, and the client device may be allowed or prevented from connecting to the Wi-Fi network based on the response.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
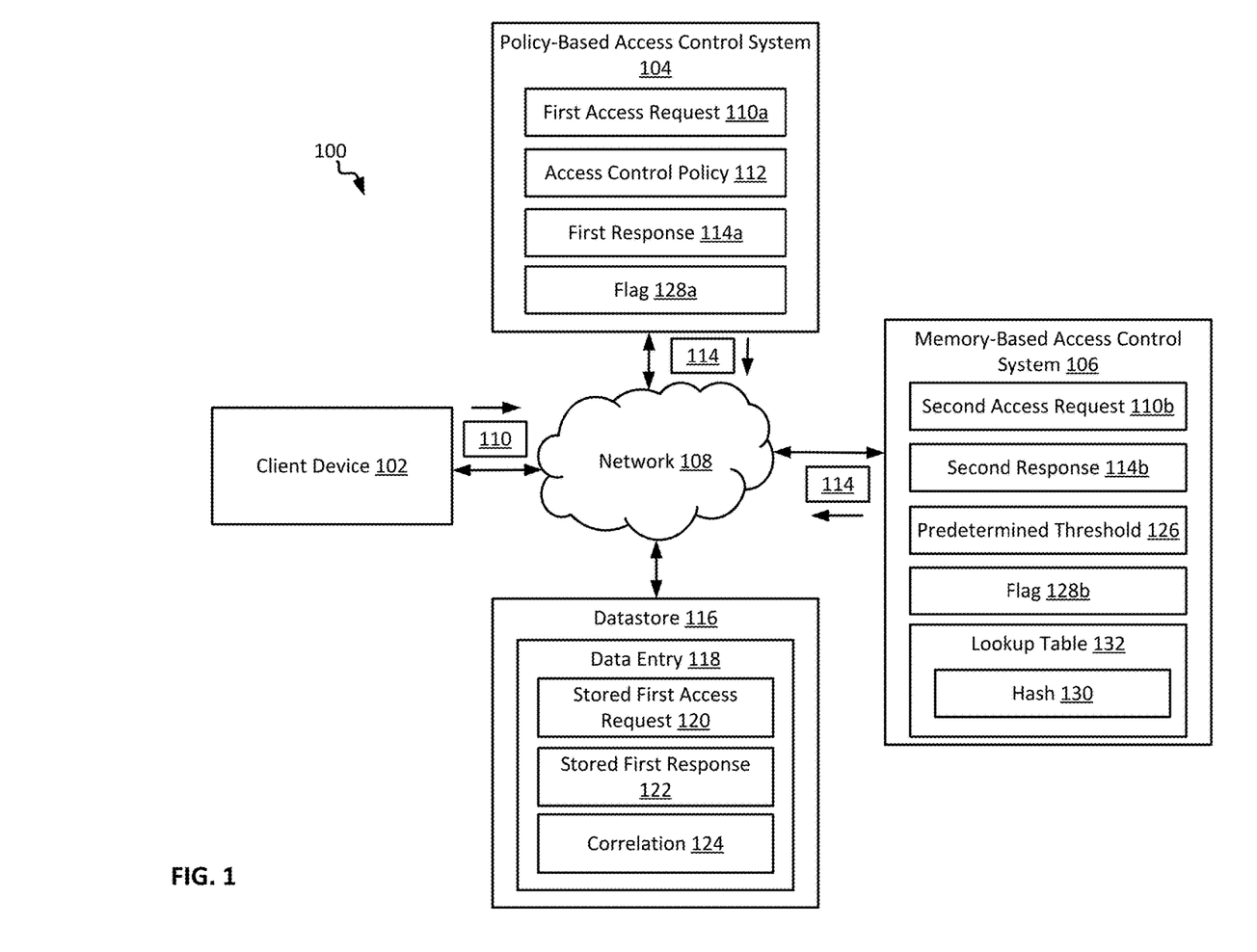
FIG. 1 shows a block diagram of an example of a system for managing access requests for a policy-based access control system according to some aspects of the present disclosure.

FIG. 1 shows a block diagram of an example of a system 100 for managing access requests 110 for a policy-based access control system 104 according to some aspects of the present disclosure. The system 100 includes a client device 102, a policy-based access control system 104, a memory-based access control system 106, and a datastore 116 that are in communication via a network 108, such as a local area network or the Internet. Examples of the client device 102 can include a laptop computer, desktop computer, server, and a mobile phone.

The policy-based access control system 104 can include one or more access control policies 112. The access control policies 112 can be rules that govern access to resources, such as computing resources or network resources. The client device 102 can transmit access requests 110 to the policy-based access control system 104 for requesting access to a particular resource. In some examples, the access request 110 may specify the particular resource, the user requesting access to the resource, and the requested action for the particular resource. The policy-based access control system 104 may include access control policies 112 that apply to the particular resource, the user requesting access, and the requested action. Examples of the policy-based access control system can include role-based access control (RBAC) systems, organization-based access control (OrBAC) systems, attribute-based access control (ABAC) systems, or any other access control systems.

In one particular example, the policy-based access control system 104 may receive a first access request 110a transmitted by the client device 102. The policy-based access control system 104 may determine an access control policy 112 associated with the first access request 110a. The policy-based access control system 104 can generate a first response 114a to the first access request 110a approving or denying access to the particular resource based on the access control policy 112. The policy-based access control system 104 can transmit the first response 114a to the client device 102. Alternatively or additionally, the first response 114a may be transmitted to another component within the system 100 that controls access to the particular resource. The client device 102 may then be granted or denied access to the particular resource depending on the first response 114a.

After determining the first response 114a, the policy-based access control system 104 can transmit the first response 114a to be stored in a data entry 118 of a datastore 116. The data entry 118 in the datastore 116 can include a correlation 124 between the first access request 110a and the first response 114a. In some examples, the data entry 118 may include a hash of the first access request 110a and a hash of the first response 114a. In some examples, the policy-based access control system 104 may store the data entry 118 in response to receiving an access request 110 for the particular resource for the first time.

Over time, the client device 102 may send multiple access requests 110 for the particular resource. In some cases, it may be beneficial for the system 100 to determine responses 114 to access requests 110 by accessing the data entry 118, rather than applying the access control policy 112 to each received access request 110. To determine how the access requests 110 should be handled, a flag 128, such as a feature flag, may be set for indicating how future access requests 110 for the particular resource are handled. For example, the system 100 may include a policy enforcement point that may receive all access requests 110 sent by the client device 102. The policy enforcement point may forward the access requests 110 to the memory-based access control system 106 or the policy-based access control system 104 depending on which flags are set. Setting flag 128a may allow the policy-based access control system 104 to determine responses 114 to access requests 110. Setting flag 128b may allow the memory-based access control system 106 to determine responses 114 to access requests 110. One or both of the flags 128a-b may be set in response to certain conditions being met. In some examples, flag 128a may be set if flag 128b is not set.

In one example, the system 100 (e.g., a policy enforcement point therein) may monitor the number of access requests 110 received for the particular resource. If the number of access requests 110 exceeds a predetermined threshold 126, the policy enforcement point may set flag 128b. In some examples, the predetermined threshold 126 may be a threshold number of access requests 110 received during a particular timeframe. If the policy enforcement point determines that the number of access requests 110 received no longer exceeds the predetermined threshold 126, the policy enforcement point may disable flag 128a. In some examples, the policy-based access control system 104 may store a data entry 118 for an access request 110 in response to the number of access requests 110 exceeding the predetermined threshold 126.

Additionally or alternatively, the policy enforcement point may monitor computing resources consumed by the system 100, such as CPU load, memory usage, network latency, or available bandwidth. In this example, the predetermined threshold 126 can be a threshold amount of computing resources being consumed by the system 100. The policy enforcement point can determine an amount of computing resources being consumed by the system 100, and can determine if the amount exceeds the predetermined threshold 126. To reduce the strain on the system 100, the policy enforcement point can set a flag 128a for causing the memory-based access control system 106 determine the responses 114 rather than the policy-based access control system 104.

The memory-based access control system 106 may determine responses 114 to access requests 110 via the data entry 118 in the datastore 116, rather than by applying the access control policy 112. For example, after flag 128a is set, the client device 102 may transmit a second access request 110b to the policy-based access control system 104. Because flag 128a is set, the second access request 110b may be redirected to the memory-based access control system 106. The memory-based access control system 106 may determine a second response 114b to the second access request 110b based on the data entry 118 in the datastore 116 rather than the access control policy 112. For example, the memory-based access control system 106 may access the correlation 124 or the stored first response 122 for the stored first access request 120 in the data entry 118 to determine the second response 114b. The memory-based access control system 106 may then transmit the second response 114b to the client device 102. The memory-based access control system 106 can also approve or deny access for the client device 102 to the particular resource based on the second response 114b.

In some examples, the datastore 116 may be a cache memory. In other examples, the memory-based access control system 106 may utilize Git or another code development system to store and access the data entry 118 in the datastore 116, which may be a graph database. For example, the memory-based access control system 106 may issue a Git commit with the first access request 110a as the key and the first response 114a as the value. The memory-based access control system 106 can then store a hash 130 associated with the Git commit in a lookup table 132 in the memory-based access control system 106. Additionally, the memory-based access control system 106 may store the data entry 118 including the stored first access request 120 and the stored first response 122 in the datastore 116. If the second access request 110b is routed to the memory-based access control system 106, the memory-based access control system 106 may check the lookup table 132. If there is a hash 130 in the lookup table 132 associated with the second access request 110b, the memory-based access control system 106 may issue a git pull command to retrieve the data entry 118 and determine the second response 114b. The system 100 may then allow or deny the client device 102 access to the particular resource based on the second response 114b. In some examples, the memory-based access control system 106 may then transmit the second response 114b to the policy-based access control system 104 for forwarding to the client device 102. Alternatively, the memory-based access control system 106 may transmit the second response 114b to the client device 102. While the above example is described with respect to Git, it will be appreciated that Git is one type of code development tool and a similar process may be implemented using other types of code development tools.

Figure 2:
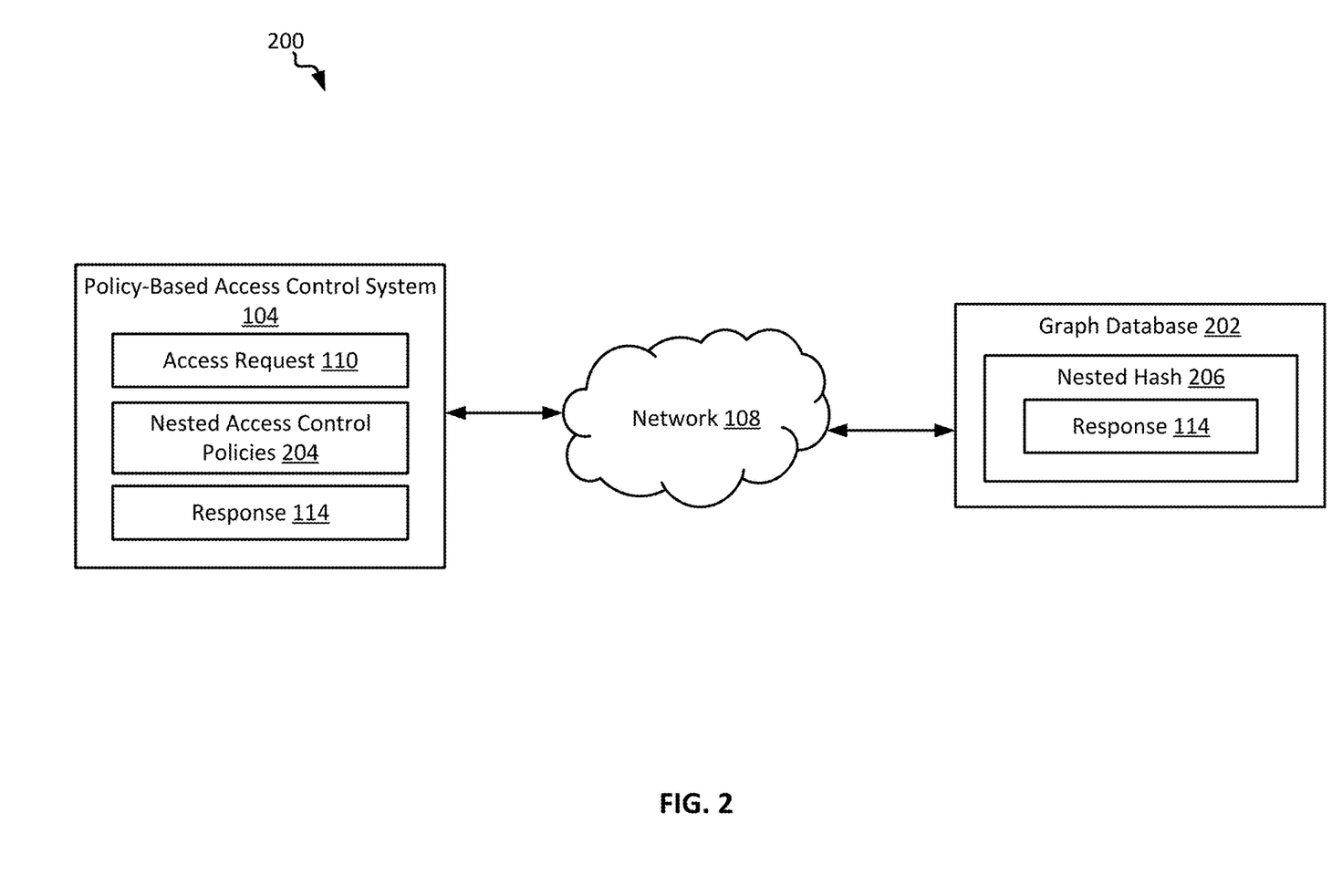
FIG. 2 shows a block diagram of another example of a system for managing access requests for a policy-based access control system according to some aspects of the present disclosure.

In some examples, the memory-based access control system 106 may utilize a code development tool to store more complicated responses 114. An example of this is shown in FIG. 2. As shown, the system 200 includes a policy-based access control system 104 in communication with a graph database 202 via network 108. The policy-based access control system 104 may determine responses 114 to access requests 110 via nested access control policies 204. Applying nested access control policies 204 may be more computationally demanding than applying typical access control policies 112. Applying a nested access control policy 204 to an access request 110 may result in a response 114 that includes multiple values in a hierarchical structure. The response 114 may be stored in a graph database 202, such as by the memory-based access control system 106 of FIG. 1, as a nested hash 206. For example, each value in the response 114 can be stored as a node with a hierarchical relationship to other nodes in the nested hash 206. To access the response 114, a pull command can be issued for each node, and the nodes can be rebased to generate the response 114. The response 114 can then be transmitted, such as to the client device 102 of FIG. 1. Alternatively or additionally, the response 114 can be used, such as by a policy enforcement point within the system 200, to allow or deny access to the particular resource.

Although FIGS. 1-2 show a particular number and combination of components, this is intended to be illustrative and non-limiting. Other examples may include more components, fewer components, different components, or a different combination of components than is shown in FIGS. 1-2. For example, although the system 100 includes one client device and one datastore with one entry, the system 100 may include any number of client devices, datastores, or data entries in other examples.

Figure 3:
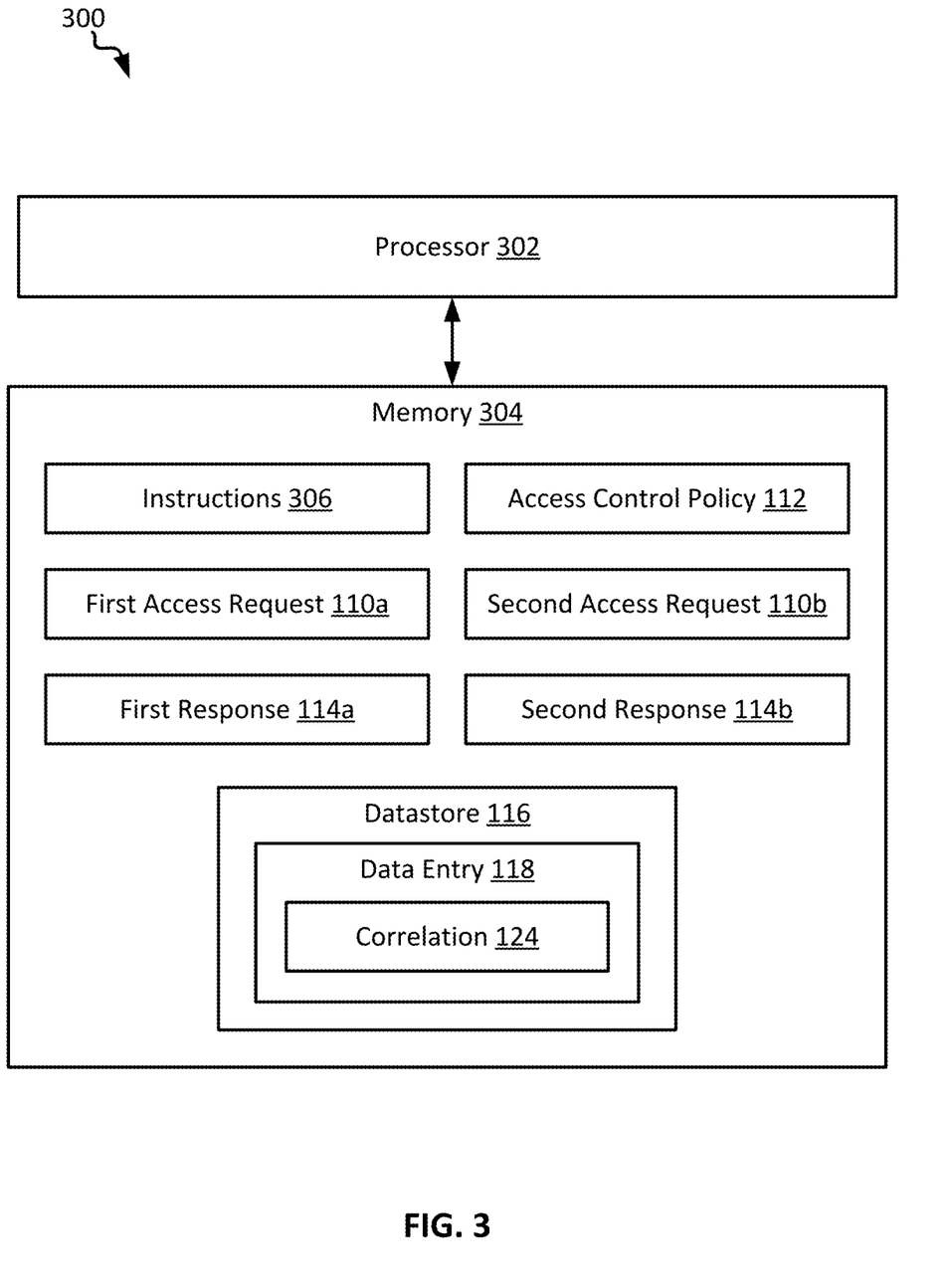
FIG. 3 is a block diagram of another example of a system for managing access requests for a policy-based access control system according to some aspects of the present disclosure.

FIG. 3 is a block diagram of another example of a system 300 for managing access requests 110 for a policy-based access control system 104 according to some aspects of the present disclosure. The system 300 includes a processor 302 that is communicatively coupled to a memory 304. In some examples, the processor 302 and the memory 304 can be part of the same computing device. In other examples, the processor 302 and the memory 304 can be distributed from (e.g., remote to) one another.

The processor 302 can include one processor or multiple processors. Examples of the processor 302 include a Field-Programmable Gate Array (FPGA), an application-specific integrated circuit (ASIC), a microprocessor, etc. The processor 302 can execute instructions 306 stored in the memory 304 to perform operations. The instructions 306 may include processor-specific instructions generated by a compiler or an interpreter from code written in any suitable computer-programming language, such as C, C++, C#, and Java.

The memory 304 can include one memory or multiple memories. The memory 304 can be non-volatile and may include any type of memory that retains stored information when powered off. Examples of the memory 304 include electrically erasable and programmable read-only memory (EEPROM), flash memory, or any other type of non-volatile memory. At least some of the memory 304 can include a non-transitory computer-readable medium from which the processor 302 can read instructions 306. A computer-readable medium can include electronic, optical, magnetic, or other storage devices capable of providing the processor 302 with computer-readable instructions or other program code. Examples of computer-readable mediums include magnetic disks, memory chips, ROM, random-access memory (RAM), an ASIC, a configured processor, optical storage, or any other medium from which a computer processor can read the instructions 306. In some examples, the memory 304 can include a datastore 116.

The processor 302 can execute the instructions 306 to perform operations. For example, the processor 302 can receive a first access request 110a from a client device for accessing a particular resource. The processor 302 can determine a first response 114a approving or denying to the first access request 110a based on an access control policy 112. The processor 302 can store a data entry 118 indicating the first response 114a to the first access request 110a. The processor 302 can also set a flag 128 to indicate that a future access request 110 for the particular resource is to be handled using the data entry 118. Subsequent to setting the flag 128, the processor 302 can receive a second access request 110b for accessing the particular resource. Based on determining that the flag 128 is set, the processor 302 can then determine a second response 114b to the second access request 110b based on the data entry 118 rather than the access control policy 112.

Figure 4:
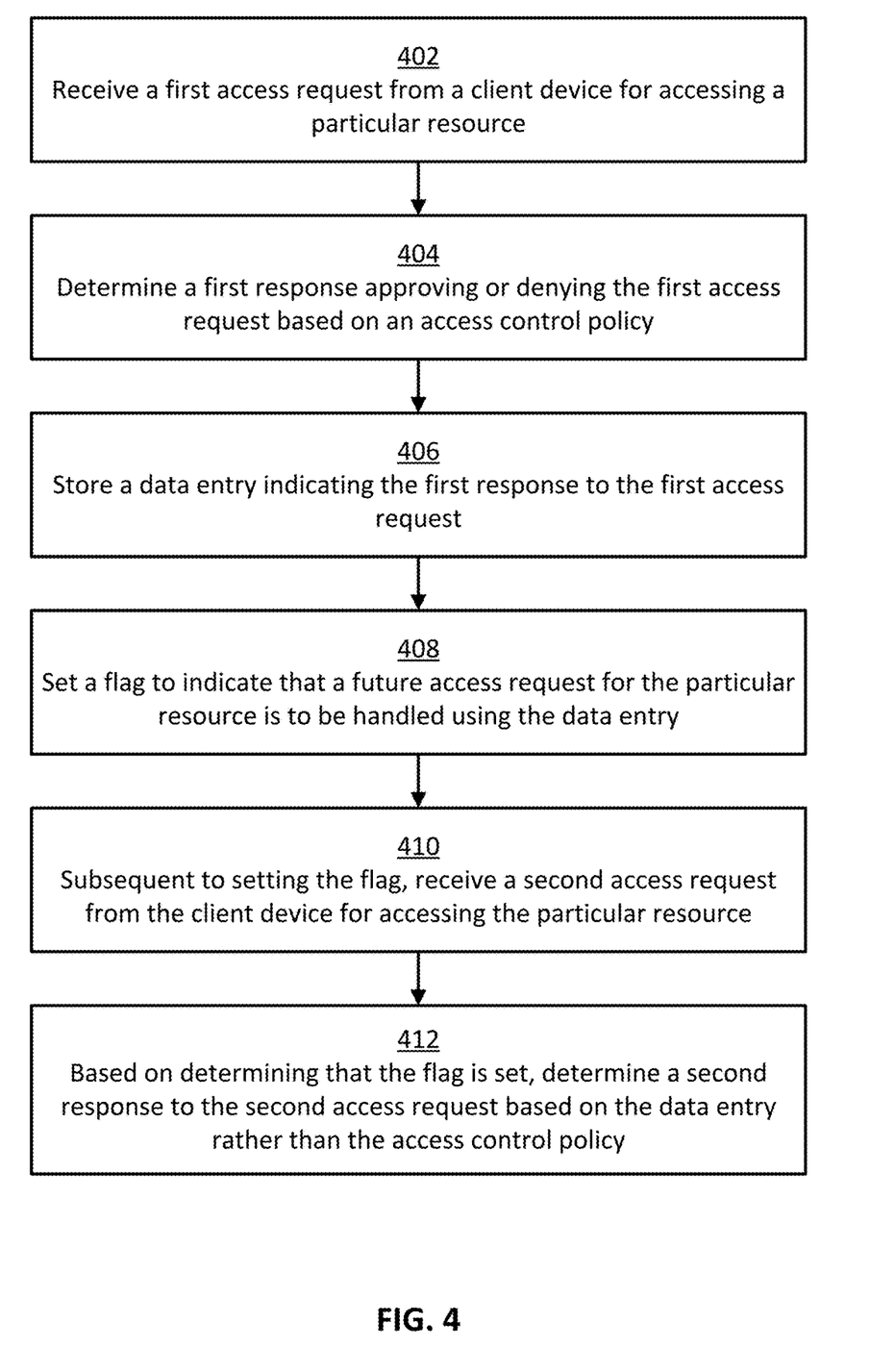
FIG. 4 is a flow chart of an example of a process for managing access requests for a policy-based access control system according to some aspects of the present disclosure.
Figure 5:
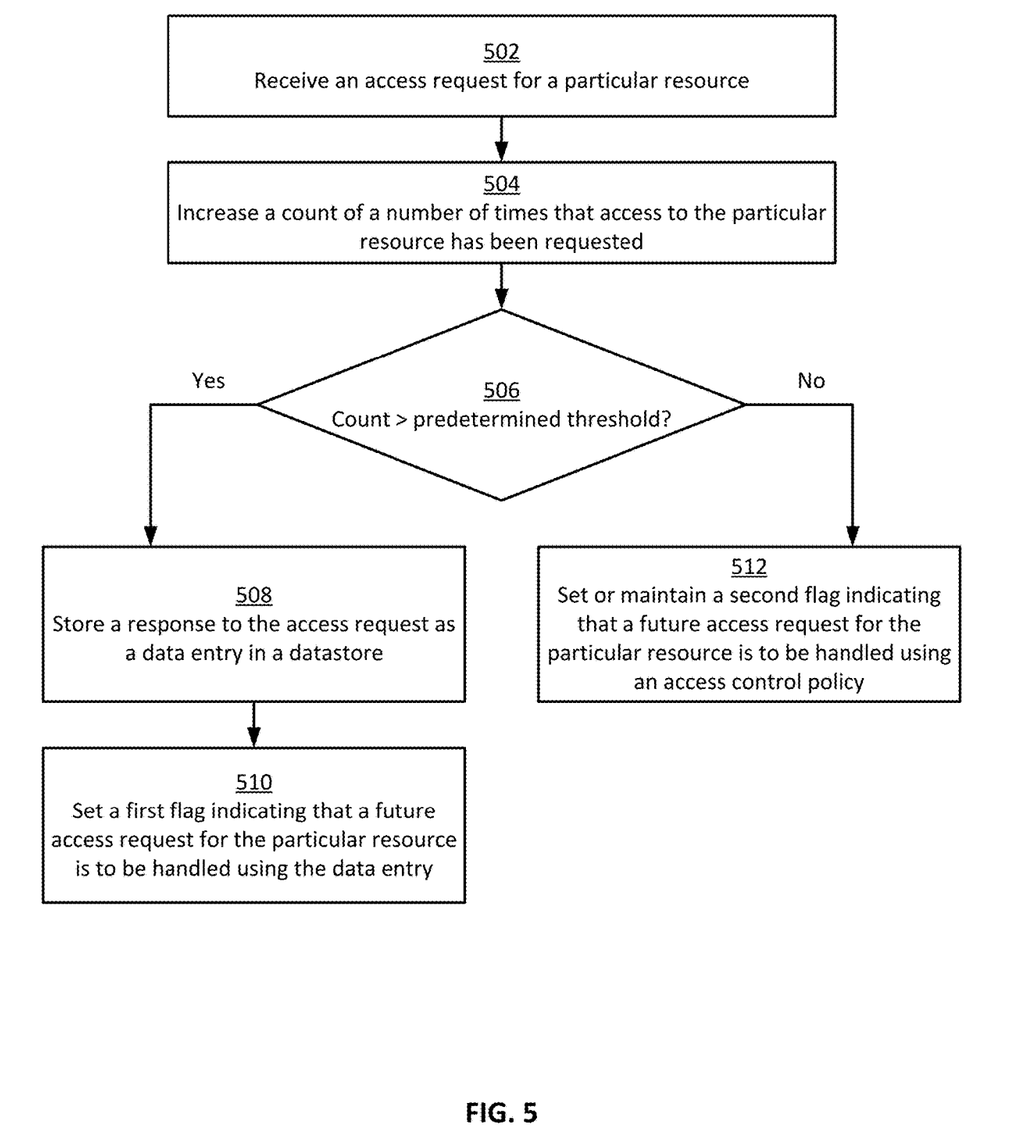
FIG. 5 is a flow chart of another example of a process for determining how access requests for a particular resource are to be handled according to some aspects of the present disclosure.

In some examples, the processor 302 can implement some or all of the steps shown in FIGS. 4-5. Other examples may involve more steps, fewer steps, different steps, or a different order of the steps than is shown in FIGS. 4-5. The steps of FIGS. 4-5 are described below with reference to components described above with regard to FIGS. 1-3.

Turning to FIG. 4, at block 402, the processor 302 receives, a first access request 110a from a client device 102 for accessing a particular resource. The particular resource may be a computing resource or a network resource. Examples of computing resources and network resources can include files, folders, applications and other software, and hardware (e.g., processors, memory, and storage). In one example, the first access request 110a may be a request for the client device 102 to delete a particular file.

At block 404, the processor 302 determines a first response 114a approving or denying the first access request 110a based on an access control policy 112. The application of the access control policy 112 can depend on attributes of the first access request 110a, such as the particular resource that is requested, the source of the first access request 110a, and the action for the particular resource that is being requested. For example, the access control policy 112 may dictate that the particular file may be only be edited by certain authorized users. If the client device 102 is included as an authorized user in the access control policy 112, applying the access control policy 112 may result in a first response 114a that approves the first access request 110a. Alternatively, if the client device 102 is not included as an authorized user in the access control policy 112, applying the access control policy 112 may result in a first response 114a that denies the first access request 110a.

At block 406, the processor 302 stores a data entry 118 indicating the first response 114a to the first access request 110a. For example, the processor 302 may store the data entry 118 in a datastore 116. In some examples, the processor 302 may store the first access request 110a and the first response 114a as a stored first access request 120 and a stored first response 122 in the data entry 118. The data entry 118 may be used to determine future access requests 110 for the particular resource.

At block 408, the processor 302 may set a flag 128 to indicate that a future access request 110 is to be handled using the data entry 118. The flag 128 may be set in response to a condition being met, such as a network latency exceeding a predetermined threshold 126. The processor 302 may disable the flag 128 if the condition is no longer met, such as when the network latency no longer exceeds the predetermined threshold 126.

At block 410, subsequent to setting the flag 128, the processor 302 receives a second access request 110b from the client device 102 for accessing the particular resource. In some examples, the processor 302 may determine that the second access request 110b is the same as or similar to the first access request 110a. For example, the second access request 110b may also be a request for the client device 102 to delete the particular file. In another example, the second access request 110b may be a request for the client device 102 to edit the particular file. The processor 302 may determine that the second access request 110b and the first access request 110a are similar enough that each would receive the same response 114.

At block 412, based on determining that the flag 128 is set, the processor 302 determines a second response 114b to the second access request 110b based on the data entry 118 rather than the access control policy 112. For example, if the data entry 118 is stored in a database (e.g., of Git), the processor 302 may issue a command for accessing the correlation 124 in the data entry 118. The processor 302 may determine the second response 114b based on the correlation 124. In some examples, determining the second response 114b based on the correlation 124 may be faster than determining the second response 114b by applying the access control policy 112. The processor 302 may then transmit the second response 114b to the client device 102.

In some examples, the processor 302 perform the operations described above with respect to block 406 in response to a condition being met. This is described in further detail in FIG. 5.

Referring now to FIG. 5, at block 502, the processor 302 can receive an access request 110 for a particular resource from a client device 102. The processor 302 can receive the access request 110 via the Internet or another network.

At block 504, the processor 302 can increase a count of a number of times that access to the particular resource has been requested. If the particular resource has not been previously requested, the processor 302 may start a new count of the number of times that access to the particular resource has been requested. The new count may have a default value of 1, because the processor 302 received the access request 110 one time so far.

At block 506, the processor 302 can determine if the count is greater than a predetermined threshold 126. The count exceeding the predetermined threshold 126 may indicate that the particular resource that is being requested by the client device 102 is popular, and it may be beneficial to store the response 114 for the access request 110 for future use rather than re-applying the access control policy 112 each time the access request 110 for the particular resource is received. If the processor 302 determines that the count is greater than the predetermined threshold 126, the process continues to block 508.

At block 508, the processor 302 stores a response 114 to the access request 110 as a data entry 118 in the datastore 116. The response 114 may be generated based on an access control policy 112 to the access request 110. In some examples, the data entry 118 may include further information regarding the access request 110 and the response 114, such as the response time used to generate the response 114 or timestamps for when the access request 110 was received or when the response 114 was transmitted.

At block 510, the processor 302 sets a first flag 128a indicating that a future access request 110 for the particular resource is to be handled using the data entry 118. For example, the first flag 128a may cause future access requests 110 to be redirected to the memory-based access control system 106, which can access the data entry 118 in the datastore 116.

If the processor 302 determines that the count is not greater than the predetermined threshold 126, the process continues to block 512. At block 512, the processor 302 sets or maintains one or more flags, such as a second flag 128b, indicating that a future access request 110 for the particular resource is to be handled using an access control policy 112 rather than using the data entry 118. For example, setting or maintaining the second flag 128b may cause future access requests 110 to be directed to the policy-based access control system 104.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A non-transitory computer-readable medium comprising program code that is executable by a processor for causing the processor to:
   receive a first access request from a client device of a user for accessing a particular resource in a computer network;
   receive, from a role-based access control (RBAC) system of the computer network, a first response approving or denying the first access request based on an access control policy selected by the RBAC from among a plurality of access control policies, wherein the access control policy is selected by the RBAC from among the plurality of access control policies based on multiple factors including the user, the particular resource to be accessed, and a particular action to be performed with respect to the particular resource;

store a data entry indicating the first response to the first access request;

in an operation distinct from storing the data entry, set a flag to a first value, wherein the flag comprises a binary value and is distinct from the data entry and the first response;

subsequent to setting the flag to the first value:
  receive a second access request from the client device for accessing the particular resource;
  based on receiving the second access request, determine whether the flag is set to the first value; and
  based on determining that the flag is set to the first value:
    extract the first response from the data entry; and
    use the extracted first response as a second response for the second access request, the second response being generated without using the access control policy; and dynamically switch the flag between the first value and a second value over time based on changing operating conditions in the computer network, wherein when the flag is set to the first value, access requests from the client device for the particular resource are handled using the stored first response in the data entry rather than the access control policy, and wherein when the flag is set to the second value, access requests from the client device for the particular resource are handled using the access control policy rather than the stored first response in the data entry.

2. The non-transitory computer-readable medium of claim 1, further comprising program code that is executable by the processor for causing the processor to, prior to receiving the second access request:
  determine a number of times that access requests have been received for accessing the particular resource;
  determine that the number of times exceeds a predetermined threshold;
  in response to determining that the number of times exceeds the predetermined threshold:
    store the data entry in a datastore; and
    set the flag to the first value.

3. The non-transitory computer-readable medium of claim 1, wherein the data entry includes a correlation between the first access request and the first response.

4. The non-transitory computer-readable medium of claim 1, wherein the flag is a first flag, and further comprising program code that is executable by the processor for causing the processor to:
  determine a number of times that access requests have been received for accessing the particular resource;
  determine that the number of times is below a predetermined threshold; and
  in response to determining that the number of times is below the predetermined threshold, set a second flag for causing future access requests for the particular resource to be handled using the access control policy rather than the data entry, the second flag being different from the first flag.

5. The non-transitory computer-readable medium of claim 4, further comprising program code that is executable by the processor for causing the processor to, subsequent to setting the second flag:
  receive an access request for accessing the particular resource;
  determine that the second flag is set; and
  in response to determining that the second flag is set, determine a response to the access request based on the access control policy rather than the data entry.

6. The non-transitory computer-readable medium of claim 1, further comprising program code that is executable by the processor for causing the processor to:
  receive an access request for the particular resource;
  determine an amount of computing resources that are being consumed;
  determine that the amount of computing resources exceeds a predetermined threshold; and
  in response to determining that the amount exceeds the predetermined threshold:
    set the flag to the first value; and
    determine a response to the access request based on the data entry rather than the access control policy.

7. The non-transitory computer-readable medium of claim 1, wherein the flag is a first flag, and further comprising program code that is executable by the processor for causing the processor to:
  receive an access request for the particular resource;
  determine an amount of computing resources that are being consumed;
  determine that the amount of computing resources is less than a predetermined threshold; and
  in response to determining that the amount is less than the predetermined threshold:
    set a second flag for causing the response to the access request to be determined based on the access control policy rather than the data entry, wherein the second flag is different from the first flag; and
    determine the response to the access request based on the access control policy rather than the data entry.

8. The non-transitory computer-readable medium of claim 1, wherein the data entry includes a hash of the first access request and a hash of the first response.

9. The non-transitory computer-readable medium of claim 1, further comprising program code that is executable by the processor for causing the processor to:
  determine the first response based on a plurality of nested access control policies;
  generate a nested hash based on the first response; and
  store the nested hash in relation to the first access request in a graph database, the data entry including the nested hash.

10. The non-transitory computer-readable medium of claim 1, further comprising program code that is executable by the processor for causing the processor to store the data entry in a cache memory.

11. A system comprising:
  a processor; and
  a memory comprising instructions that are executable by the processor for causing the processor to:
    receive a first access request from a client device of a user for accessing a particular resource in a computer network;
    receive, from a role-based access control (RBAC) system of the computer network, a first response approving or denying the first access request based on an access control policy selected by the RBAC from among a plurality of access control policies, wherein the access control policy is selected by the RBAC from among the plurality of access control policies based on multiple factors including the user, the particular resource to be accessed, and a particular action to be performed with respect to the particular resource;

store a data entry indicating the first response to the first access request;

in an operation distinct from storing the data entry, set a flag to a first value, wherein the flag comprises a binary value and is distinct from the data entry and the first response;

subsequent to setting the flag to the first value:
receive a second access request from the client device for accessing the particular resource;
based on receiving the second access request, determine whether the flag is set to the first value; and
based on determining that the flag is set to the first value:
extract the first response from the data entry; and
use the extracted first response as a second response for the second access request, the second response being generated without using the access control policy; and dynamically switch the flag between the first value and a second value over time based on changing operating conditions in the computer network, wherein when the flag is set to the first value, access requests from the client device for the particular resource are handled using the stored first response in the data entry rather than the access control policy, and wherein when the flag is set to the second value, access requests from the client device for the particular resource are handled using the access control policy rather than the stored first response in the data entry.

12. The system of claim 11, further comprising instructions that are executable by the processor for causing the processor to, prior to receiving the second access request:
determine a number of times that access requests have been received for accessing the particular resource;
determine that the number of times exceeds a predetermined threshold;
in response to determining that the number of times exceeds the predetermined threshold:
store the data entry in a datastore; and
set the flag to the first value.

13. The system of claim 11, wherein the data entry includes a correlation between the first access request and the first response.

14. The system of claim 11, further comprising instructions that are executable by the processor for causing the processor to:
determine a number of times that access requests have been received for accessing the particular resource;
determine that the number of times is below a predetermined threshold; and
in response to determining that the number of times is below the predetermined threshold, configure one or more flags in a particular way to cause future access requests for the particular resource is to be handled using the access control policy rather than the data entry, the one or more flags being different than the data entry and the first response.

15. The system of claim 14, further comprising instructions that are executable by the processor for causing the processor to, subsequent to configuring the one or more flags in the particular way:
receive an access request for accessing the particular resource;
determine that the one or more flags are configured in the particular way; and
in response to determining that the one or more flags are configured in the particular way, determine a response to the access request based on the access control policy rather than the data entry.

16. A method comprising:
receiving, by a processor, a first access request from a client device of a user for accessing a particular resource in a computer network;
receiving, by the processor and from a role-based access control (RBAC) system of the computer network, a first response approving or denying the first access request based on an access control policy selected by the RBAC from among a plurality of access control policies, wherein the access control policy is selected by the RBAC from among the plurality of access control policies based on multiple factors including the user, the particular resource to be accessed, and a particular action to be performed with respect to the particular resource;
storing, by the processor, a data entry indicating the first response to the first access request;
in an operation distinct from storing the data entry, setting, by the processor, a flag to a first value, wherein the flag comprises a binary value, the flag being distinct from the data entry and the first response;
subsequent to setting the flag to the first value:
receiving, by the processor, a second access request from the client device for accessing the particular resource;
based on receiving the second access request, determining, by the processor, whether the flag is set to the first value; and
based on determining that the flag is set to the first value:
extracting, by the processor, the first response from the data entry; and
using, by the processor, the extracted first response as a second response for the second access request, the second response being generated without using the access control policy; and
dynamically switching the flag between the first value and a second value over time based on changing operating conditions in the computer network, wherein when the flag is set to the first value, access requests from the client device for the particular resource are handled using the stored first response in the data entry rather than the access control policy, and wherein when the flag is set to the second value, access requests from the client device for the particular resource are handled using the access control policy rather than the stored first response in the data entry.

17. The method of claim 16, wherein the changing operating conditions include a change in resource consumption by the computer network.

18. The method of claim 16, wherein the changing operating conditions include a change in a volume of access control requests received from the client device over a time window.

19. The method of claim 16, further comprising, prior to receiving the second access request:
  determining a number of times that access requests have been received for accessing the particular resource;
  determining that the number of times exceeds a predetermined threshold;
  in response to determining that the number of times exceeds the predetermined threshold:
    storing the data entry in a datastore; and
    setting the flag to the first value.
20. The method of claim 16, further comprising:
  determining a number of times that access requests have been received for accessing the particular resource;
  determining that the number of times is below a predetermined threshold; and
  in response to determining that the number of times is below the predetermined threshold, configuring one or more flags in a particular way for causing future access requests for the particular resource to be handled using the access control policy rather than the data entry, the one or more flags being different from the data entry and the first response, and the one or more flags including the flag.
21. The method of claim 20, further comprising, subsequent to configuring the one or more flags in the particular way:
  receiving an access request for accessing the particular resource;
  determining that the one or more flags are configured in the particular way; and
  in response to determining that the one or more flags are configured in the particular way, determining a response to the access request based on the access control policy rather than the data entry.

* * * * *